(12) United States Patent
Kuroiwa

(10) Patent No.: US 10,402,023 B2
(45) Date of Patent: Sep. 3, 2019

(54) DISPLAY CONTROL AND TOUCH CONTROL DEVICE, AND DISPLAY AND TOUCH SENSE PANEL UNIT

(71) Applicant: Synaptics Japan GK, Tokyo (JP)

(72) Inventor: Tsuyoshi Kuroiwa, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 82 days.

(21) Appl. No.: 15/494,086

(22) Filed: Apr. 21, 2017

(65) Prior Publication Data
US 2018/0004321 A1 Jan. 4, 2018

(30) Foreign Application Priority Data
Jun. 30, 2016 (JP) .................... 2016-130304

(51) Int. Cl.
G06F 3/041 (2006.01)
G09G 5/00 (2006.01)
G06F 3/044 (2006.01)
G09G 3/36 (2006.01)

(52) U.S. Cl.
CPC ............ *G06F 3/044* (2013.01); *G06F 3/0412* (2013.01); *G06F 3/0416* (2013.01); *G09G 3/3648* (2013.01); *G09G 3/3696* (2013.01); *G06F 2203/04112* (2013.01); *G09G 3/3674* (2013.01); *G09G 2300/0426* (2013.01); *G09G 2310/08* (2013.01)

(58) Field of Classification Search
CPC .......... G06F 3/041; G06F 3/043; G06F 3/044; G06F 3/047; G09G 3/20; G09G 3/30; G09G 3/36; G09G 5/00; G02F 1/1333; G02F 1/1343; G02F 1/1335; G02F 1/1345
See application file for complete search history.

(56) References Cited

U.S. PATENT DOCUMENTS 9,024,913 B1* 5/2015 Jung ................ G06F 3/044
345/174
2006/0007095 A1* 1/2006 Kudo .................. G06F 1/3203
345/98
2007/0247932 A1* 10/2007 Tobita ................ G09G 3/3677
365/189.12

(Continued)

FOREIGN PATENT DOCUMENTS

JP 2008176159 A 7/2008

*Primary Examiner* — Chanh D Nguyen
*Assistant Examiner* — Nguyen H Truong
(74) *Attorney, Agent, or Firm* — Patterson + Sheridan, LLP

(57) ABSTRACT

Provided is a technique which enables the avoidance of a temporal damage to a panel module, and keeps a voltage load on a display panel circuit node from becoming excessively large even if a constant voltage is applied to the node for a longer time exceeding a display drive term in a non-display drive term, provided that a display frame period is divided to have display and non-display drive terms. In performing display and touch-sensing actions on condition that a display frame period is divided to include display and non-display drive terms, an operation source voltage supplied to a panel module during the non-display term where touch sensing is performed is smaller, in absolute value, than that supplied in the display term, whereby a voltage load applied to an input circuit node of a panel module for a longer time exceeding the display term is kept from being excessively large.

18 Claims, 10 Drawing Sheets

(56) References Cited

U.S. PATENT DOCUMENTS

| | | | |
|---|---|---|---|
| 2009/0040149 A1* | 2/2009 | Nishinohara | G09G 3/3216 345/76 |
| 2011/0148825 A1* | 6/2011 | Ueno | G09G 3/006 345/204 |
| 2013/0241814 A1* | 9/2013 | Hirabayashi | G09G 3/3677 345/100 |
| 2014/0204041 A1* | 7/2014 | Munechika | G06F 3/0416 345/173 |
| 2014/0210751 A1* | 7/2014 | Okamura | G06F 3/0416 345/173 |
| 2014/0253525 A1* | 9/2014 | Munechika | G09G 3/3611 345/204 |
| 2014/0253536 A1* | 9/2014 | Honda | G06F 3/044 345/213 |
| 2014/0292688 A1 | 10/2014 | Munechika | |
| 2014/0292711 A1* | 10/2014 | Teranishi | G09G 3/3696 345/174 |
| 2015/0103038 A1* | 4/2015 | Han | G06F 3/044 345/174 |
| 2017/0108970 A1* | 4/2017 | Kim | G06F 3/0412 |
| 2017/0123537 A1* | 5/2017 | Yeh | G06F 3/0412 |
| 2017/0285849 A1* | 10/2017 | Kim | G06F 3/044 |

* cited by examiner

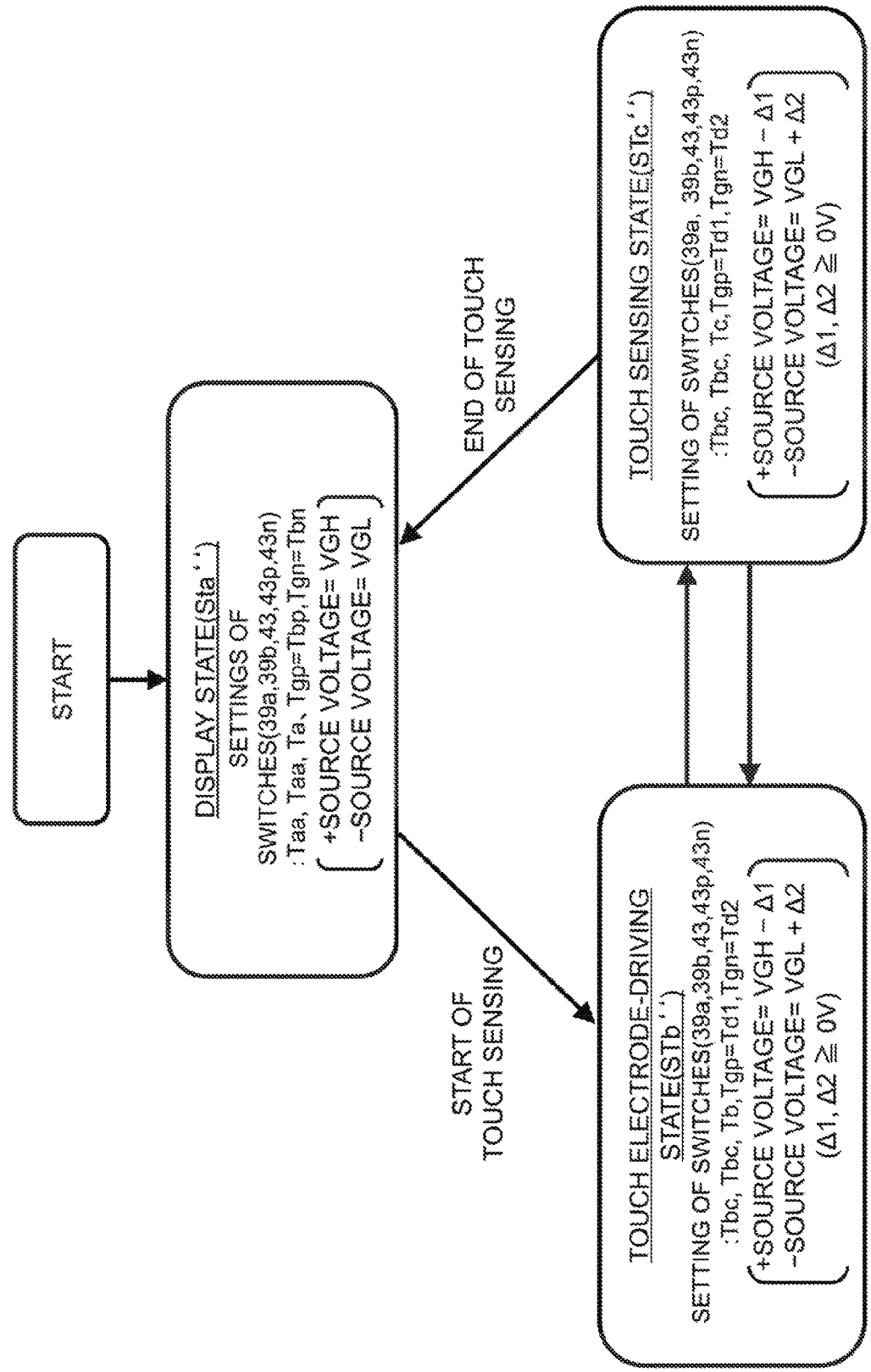

ically formed. The present application claims priority to Japanese application JP 2016-130304 filed on Jun. 30, 2016, the content of which is hereby incorporated by reference into this application in its entirety.

DISPLAY CONTROL AND TOUCH CONTROL DEVICE, AND DISPLAY AND TOUCH SENSE PANEL UNIT

CROSS-REFERENCE TO RELATED APPLICATIONS

The present application claims priority to Japanese application JP 2016-130304 filed on Jun. 30, 2016, the content of which is hereby incorporated by reference into this application in its entirety.

BACKGROUND

The present disclosure relates to a display control and touch control device which alternately produces a display drive term and a non-display drive term and controls a display panel and a touch panel and a display and touch sense panel unit having such a display control and touch control device incorporated therein. Particularly, the disclosure describes a technique for driving and controlling a panel module arranged by incorporated a touch panel into a display panel operable to perform liquid crystal display.

A portable information terminal device, such as a tablet or a smart phone, has a panel module disposed on a surface; the panel module is arranged by putting together or integrally forming a display panel and a touch panel. Such a portable information terminal device is arranged to be able to determine, from touch coordinates, a touch operation performed on a surface of the touch panel by a finger or the like according to screen display on the display panel in the event of the touch operation. The display panel and the touch panel are subjected to the influence of noise from each other owing to the capacitive coupling or the like between the display panel and touch panel put together or integrally formed. The operation noise of each of a display panel and a touch panel can be prevented from influencing the other panel by dividing a display frame period to have a plurality of display drive terms and non-display drive terms each arranged between the display drive terms, and driving the touch panel to perform touch sensing in a non-display drive term, such as described in the Japanese Unexamined Patent Application Publication No. JP-A-2014-203102.

The examples of a scan circuit operable to sequentially select gate lines corresponding to scan lines of the display panel include one which has a shift register. For instance, a scan circuit described in JP-A-2008-176159 is arranged as follows. A start pulse is shifted in a later stage in synchronization with the change in shift clock, a driver receives an output of each shift stage. The driver is operated to perform an output action in synchronization with a gate clock of twice the frequency of a shift pulse and thus, gate lines are sequentially activated to a select level in synchronization with twice the frequency of the shift pulse while synchronizing with the shift of the start pulse.

SUMMARY

To stop selecting the gate lines during a non-display drive term in which a touch sensing is performed on condition that a display frame period is divided to include display and non-display drive terms as described above, means for stopping a shift clock of a shift register and stopping the clock change in gate clock in line with the non-display drive term may be used. According to this, at the time when the shift clock of the shift register is stopped, the start pulse has been delivered and an output of the shift stage is made a logical value of an output instruction. The following have been found as to such a non-display drive term. That is, an output of the shift stage remains fixed to the logical value of the output instruction during the non-display drive term; the non-display drive term is longer than a scan line select time (horizontal synchronization time) in a display drive term; a voltage load on an input of the driver receiving an output of a shift stage becomes larger; the gate characteristic of an input transistor of the driver is degraded with time and consequently, an off-leak current can be increased. The degradation of the characteristic like this can lead to the worsening of the display performance or unevenness in display owing to undesired leak of gradation voltage signals held by display elements.

It is one object of the disclosure to provide a technique arranged so that a temporal damage to a panel module can be avoided, by which even a circuit node of a display panel, to which a constant voltage remains applied over a length of time longer than a display drive term in a non-display drive term never suffers an excessive voltage load on the node on condition that a display frame period is divided to have display and non-display drive terms.

The above and other objects of the disclosure, as well as novel features thereof will become apparent from the description hereof and the accompanying diagrams.

Of the embodiments disclosed in the present application, the representative embodiments will be briefly outlined below. It is noted that the reference numerals or character strings in parentheses in the subsequent paragraphs, which are noted for reference to the diagrams, are just examples for easier understanding.

[1] Lowering an Operation Power Source to the Panel Module in a Non-Display Drive Term A display control and touch control device (3A, 3B, 3C) performs driven control of a panel module (1) in which a display panel (10) having a plurality of display elements (PXL) arranged like a matrix, and a touch panel (11) having a plurality of touch-sensing electrodes (ECR) arranged like a matrix at a density lower than that of the plurality of display elements are integrally incorporated. The display control and touch control device has an internal circuit operable to perform: action control for producing a plurality of display drive terms and a non-display drive term sandwiched between the display drive terms prior and subsequent thereto in every display frame period; control for selecting the plurality of display elements, and display control for performing display driving of the selected display elements in the display drive term; and touch control for performing a touch-sensing action by use of the plurality of touch-sensing electrodes in the non-display drive term. The internal circuit makes an operation source voltage to supply to the panel module a first operation source voltage (VGH, VGL) in a display drive term, and makes the operation source voltage a second operation source voltage (VGH−Δ1, VGL+Δ2) smaller, in absolute value, than the first operation source voltage in the non-display drive term.

According to this embodiment, an operation source voltage supplied to the panel module in a non-display drive term in which the touch sensing is performed is smaller, in absolute value, than an operation source voltage supplied in a display period when performing display and touch-sensing actions on condition that a display frame period is divided to have display and non-display drive terms. Therefore, even if a constant voltage remains applied to the same circuit node over a long time in a term longer than the display term owing to the stop of the display action at that time, the voltage load on the circuit node never becomes excessively large. In other words, the voltage load which remains applied to the input circuit node of the panel module during a term longer than the display drive term does not become excessively large. Therefore, a temporal damage to the panel module can be avoided. In case that e.g. a display panel having a plurality of display elements of which the select terminals are connected to gate lines corresponding to scan lines respectively, arranged like a matrix, and including a shift register for sequentially selecting the gate lines is targeted for control, the source voltage of the panel module in a non-display drive term is lower than that in a display drive term even if the display control part stops the shift clock signal of the shift register in line with the non-display drive term to stop selecting the gate lines and thus, the output of the shift stage is fixed in the non-display drive term. Therefore, a driver which receives an output of the shift stage suffers no degradation in its input characteristic, causing no adverse effect on the display performance.

[2] Directly Lowering the Operation Power Source Output to the Panel Module in a Non-Display Drive Term In the display control and touch control device (3A, 3B) as described in [1], the internal circuit has: an operation control part (21A, 21B) operable to produce a plurality of display drive terms and a non-display drive term sandwiched between the display drive terms prior and subsequent thereto in every display frame period; a display control part (23A, 23B) operable to perform selective control of the plurality of display elements and display driving of the selected display elements in the display drive term; and a touch control part (24) operable to perform a touch-sensing action by use of the plurality of touch-sensing electrodes in the non-display drive term. The display control part has a power-supply part (60, 62) operable to supply the panel module with a first operation source voltage (VGH, VGL) or a second operation source voltage (VGH−Δ1, VGL+Δ2) smaller, in absolute value, than the first operation source voltage. The operation control part causes the power-supply part to supply the first operation source voltage in the display drive term, and causes the power-supply part to supply the second operation source voltage in the non-display drive term.

This embodiment is arranged so that the display control part outputs the operation power source to the panel module brings about the same effect and advantage as those achieved by the embodiment as described in [1].

[3] Specifying the Voltage of the Operation Power Source by Register Setting

In the display control and touch control device as described in [2], the power-supply part (60) has: a register circuit (36) on which the operation control part rewritably sets voltage-set data; and a power supply circuit (35) operable to produce a power source of a voltage according to voltage-set data set on the register circuit. The operation control part (21A) sets first voltage-set data (DTa+, DTa−) specifying the first operation source voltage on the register circuit in the display drive term, and sets second voltage-set data (DTbc+, DTbc−) specifying the second operation source voltage on the register circuit in the non-display drive term.

According to this embodiment, the first and second operation source voltages can be set desirably according to voltage-set data set by the register circuit.

[4] Nonvolatile Memory that Rewritably Holds First and Second Voltage-Set Data

In the display control and touch control device as described in [3], the second operation source voltage has a voltage required for suppressing the change in gradation information held by the unselected display elements; and the operation control part has a nonvolatile memory (26) for rewritably holding the first and second voltage-set data, and sets the first and second voltage-set data from the nonvolatile memory on the register circuit.

According to this embodiment, the operation control part is not required to receive the first and second voltage-set data from the host processor in action.

[5] Selective Control of the Display Elements by Shift Register Control

In the display control and touch control device as described in [3], the display control part (23A) has, for selective control of the plurality of display elements, functions for outputting shift clock signals (CK1, CKB1, CK2 and CKB2) for defining an input action of series-connected master and slave latches (LTC1, etc.) forming a shift register (SFTREG) and a latch action thereof, shift data (SFTd) to be supplied to the shift register, and a shift-suppressing pulse signal (GToff) for stopping an action for shifting the shift data. The operation control part causes the shift-suppressing pulse signal to make a pulse change in synchronization with the non-display drive term.

With this embodiment, the display control part is suitable in case that a display panel using a scan circuit including a shift register and a gate driver which receives an output of its shift stage in order to select the gate lines corresponding to the scan lines of the display panel is targeted for display control.

[6] Switching, by Switch Control, the Operation Power Source to Output

In the display control and touch control device as described in [2], the power-supply part (62) has a power supply circuit (37) operable to produce the first and second operation source voltages, and switch circuits (39a, 39b) operable to select and output the first or second operation source voltage produced by the power supply circuit. The operation control part (21B) causes the switch circuit to select the first operation source voltage in the display drive term, and causes the switch circuit to select the second operation source voltage in the non-display drive term.

According to this embodiment, the first and second operation source voltages can be easily switched by an operation on the switch circuits.

[7] Second Operation Power Source of a Voltage Required to Ensure Keeping Gradation Information Held by the Display Elements In the display control and touch control device as described in [6], the second operation power source has a voltage required for suppressing the change in gradation information held by the unselected display elements.

According to this embodiment, gradation information cannot be lost from the display elements in a non-display drive term.

[8] Selective Control of the Display Elements by Shift Register Control

In the display control and touch control device as described in [6], the display control part (23B) has, for selective control of the plurality of display elements, functions for outputting shift clock signals (CK1, CKB1, CK2 and CKB2) for defining an input action of series-connected master and slave latches (LTC1, etc.) forming a shift register (SFTREG) and a latch action thereof, shift data (SFTd) to be supplied to the shift register, and a shift-suppressing pulse signal (GToff) for stopping an action for shifting the shift data. The operation control part causes the shift-suppressing pulse signal to make a pulse change in synchronization with the non-display drive term.

With this embodiment, the display control part is suitable in case that a display panel using a scan circuit including a shift register and a gate driver which receives an output of its shift stage in order to select the gate lines corresponding to the scan lines of the display panel is targeted for display control.

[9] Lowering the Operation Power Source to Output to the Panel Module by Capacitive Coupling in a Non-Display Drive Term In the display control and touch control device (3C) as described in [1], the internal circuit has: an operation control part (21C) operable to produce a plurality of display drive terms and a non-display drive term sandwiched between the display drive terms prior and subsequent thereto in every display frame period; a display control part (23C) operable to perform selective control of the plurality of display elements and display driving of the selected display elements in the display drive term; and a touch control part (24C) operable to perform a touch-sensing action by use of the plurality of touch-sensing electrodes in the non-display drive term. The display control part has a power-supply part (62C) operable to supply the panel module with a first operation source voltage (VGH, VGL) through power source output terminals (P1, P2). The touch control part has a voltage generation part (41C, 43$p$, 43$n$) operable to output, from a voltage output terminal (P3, P4), regulation voltages (−Δ1, +Δ2) for producing a second operation source voltage (VGH−Δ1, VGL+Δ2) smaller, in absolute value, than the first operation source voltage by coupling power source stabilization capacitances to the power source output terminals by capacitive coupling. The operation control part causes the power-supply part to output the operation source voltage, and causes the voltage generation part to output a reference potential (Vdt) for the power source stabilization capacitances in the display drive term; and the operation control part makes an output of the power-supply part a high impedance, and causes the voltage generation part to output the regulation voltages to allow the regulation voltages to be coupled to the outputs of the power-supply part by capacitive coupling in the non-display drive term.

This embodiment is arranged so that the operation power source to output to the panel module is lowered by capacitive coupling in the non-display drive term brings about the same effect and advantage as those achieved by the embodiment as described in [1].

[10] Examples of the Power-Supply Part and the Voltage Generation Part

In the display control and touch control device as described in [9], the power-supply part has: a power supply circuit (37C) operable to produce the first operation source voltage; and a power source switch circuit (39$a$, 39$b$) operable to select the output of the first operation source voltage from the power source output terminals or a high-output impedance state of the power source output terminals. The voltage generation part has: a voltage generation circuit (41C) operable to produce the regulation voltages; and a voltage switch circuit (43$p$, 43$n$) operable to selectively output the regulation voltages or the reference potential from the voltage output terminal. The operation control part causes the power source switch circuits to select the output of the first operation source voltage, and the voltage switch circuit to select the output of the reference voltage in the display drive term; and the operation control part causes the power source switch circuits to select the high-output impedance state and the voltage switch circuit to select the output of the regulation voltage in the non-display drive term.

According to this embodiment, the output action by the power-supply part remains stopped in a non-display drive term, which contributes to the achievement of low power consumption.

[11] Second Operation Power Source of a Voltage Required to Ensure Keeping Gradation Information Held by the Display Elements In the display control and touch control device as described in [10], the second operation source voltage has a voltage required for suppressing the change in gradation information held by the unselected display elements.

According to this embodiment, gradation information cannot be lost from the display elements in a non-display drive term.

[12] Selective Control of the Display Elements by Shift Register Control

In the display control and touch control device as described in [10], the display control part has, for selective control of the plurality of display elements, functions for outputting shift clock signals for defining an input action of series-connected master and slave latches forming a shift register and a latch action thereof, shift data to be supplied to the shift register, and a shift-suppressing pulse signal for stopping an action for shifting the shift data. The operation control part causes the shift-suppressing pulse signal to make a pulse change in synchronization with the non-display drive term.

With this embodiment, the display control part is suitable in case that a display panel using a scan circuit including a shift register and a gate driver which receives an output of its shift stage in order to select the gate lines corresponding to the scan lines of the display panel is targeted for display control.

[13] Single Chip LSI Having a Host Interface Circuit

The display control and touch control device as described in [9] further includes a host interface circuit (25) for interfacing the display control part, the touch control part and the operation control part to a host device, and is formed on a semiconductor substrate.

This embodiment enables the achievement of a compact display control and touch control device by arranging the device in the form of a one-chip semiconductor integrated circuit. Having a host interface enables the control according to an instruction from a host device.

[14] Lowering the Operation Power Source to the Panel Module in a Non-Display Drive Term A display and touch sense panel unit (DTPU_A, DTPU_B, DTPU_C) includes: a panel module (1) in which a display panel (10) having a plurality of display elements (PXL) arranged like a matrix and having select terminals connected to gate lines (GL1 to GL1080) corresponding to scan lines respectively, and a touch panel (11) having a plurality of touch-sensing electrodes (ECR) arranged like a matrix at a density lower than that of the plurality of display elements are integrally incorporated; and a display control and touch control device (3A, 3B, 3C) operable to perform the drive control of the panel module. The panel module includes a scan circuit (12) operable to sequentially select the gate lines. The scan circuit has: a shift register (SFTREG) operable to shift, to a later stage, shift data (SFTd) in synchronization with change in shift clock signal (CK1, CKB1, CK2 and CKB2); and a gate driver (NOR1, etc.) operable to receive an output (Ld, etc.) of each shift stage of the shift register and to output a select signal of the gate line. The display control and touch control device has an internal circuit operable to perform: action control for producing a plurality of display drive terms and a non-display drive term sandwiched between the display drive terms prior and subsequent thereto in every display frame period; display control for causing the scan circuit to perform selective control of the gate lines and display driving of the selected display elements in the display drive term; and touch control for performing a touch-sensing action by use of the plurality of touch-sensing electrodes in the non-display drive term. The internal circuit makes an operation source voltage to supply to the panel module a first operation source voltage (VGH, VGL) in the display drive term, and makes the operation source voltage a second operation source voltage (VGH−Δ1, VGL+Δ2) smaller, in absolute value, than the first operation source voltage in the non-display drive term.

According to this embodiment, the source voltage of the panel module in a non-display drive term is lower than that in a display drive term even if the display control part stops the shift clock signal of the shift register in line with the non-display drive term to stop selecting the gate lines and thus, the output of the shift stage is fixed in the non-display drive term. Therefore, a gate driver which receives an output of the shift stage suffers no temporal degradation in its input characteristic, causing no adverse effect on the display performance.

[15] Directly Lowering the Operation Power Source Output to the Panel Module in a Non-Display Drive Term The display and touch sense panel unit as described in [14], the internal circuit of the display control and touch control device (3A, 3B) has: an operation control part (21A, 21B) operable to produce a plurality of display drive terms and a non-display drive term sandwiched between the display drive terms prior and subsequent thereto in every display frame period; a display control part (23A, 23B) operable to causes the scan circuit to perform selective control of the gate lines and display driving of the selected display elements in the display drive term; and a touch control part (24) operable to perform a touch-sensing action by use of the plurality of touch-sensing electrodes in the non-display drive term. The display control part causes the shift clock signal to change in clock in the display drive term, and stops the clock change of the shift clock signal in the non-display drive term. The display control part has a power-supply part (62) operable to supply the panel module with a first operation source voltage (VGH, VGL) or a second operation source voltage (VGH−Δ1, VGL+Δ2) smaller, in absolute value, than the first operation source voltage. The operation control part causes the power-supply part to supply the first operation source voltage in the display drive term, and causes the power-supply part to supply the second operation source voltage in the non-display drive term.

This embodiment arranged so that the display control part outputs the operation power source to the panel module brings about the same effect and advantage as those achieved by the embodiment as described in [14].

[16] Specifying the Voltage of the Operation Power Source by Register Setting

The display and touch sense panel unit as described in [15], the power-supply part (60) has: a register circuit (36) on which the operation control part rewritably sets voltage-set data; and a power supply circuit (35) operable to produce a power source of a voltage according to the voltage-set data set on the register circuit. The operation control part (21A) sets first voltage-set data for specifying the first operation source voltage on the register circuit in the display drive term, and sets second voltage-set data for specifying the second operation source voltage on the register circuit in the non-display drive term.

According to this embodiment, the first and second operation source voltages can be set desirably according to voltage-set data set by the register circuit.

[17] Switching the Operation Power Source to be Output

The display and touch sense panel unit as described in [15], the power-supply part (62) has: a power supply circuit (37) operable to produce the first and second operation source voltages; and switch circuits (39a, 39b) operable to select and output the first or second operation source voltage produced by the power supply circuit. The operation control part (21B) causes the switch circuit to select the first operation source voltage in the display drive term, and causes the switch circuit to select the second operation source voltage in the non-display drive term.

According to this embodiment, the first and second operation source voltages can be easily switched by an operation on the switch circuits.

[18] Lowering the Operation Power Source to Output to the Panel Module by Capacitive Coupling in a Non-Display Drive Term The display and touch sense panel unit as described in [14], the internal circuit of the display control and touch control device (3C) has: an operation control part (21C) operable to produce a plurality of display drive terms and a non-display drive term sandwiched between the display drive terms prior and subsequent thereto in every display frame period; a display control part (23C) operable to perform selective control of the plurality of display elements and display driving of the selected display elements in the display drive term; and a touch control part (24C) operable to perform a touch-sensing action by use of the plurality of touch-sensing electrodes in the non-display drive term. The display control part has a power-supply part (62C) operable to supply the panel module with a first operation source voltage (VGH, VGL) through power source output terminals (P1, P2). The touch control part has a voltage generation part (41C, 43p, 43n) operable to output, from a voltage output terminal, regulation voltages (−Δ1, +Δ2) for producing a second operation source voltage (VGH−Δ1, VGL+Δ2) smaller, in absolute value, than the first operation source voltage by coupling power source stabilization capacitances (4, 5) to the power source output terminals by capacitive coupling, and power source terminals (P4, P5). The operation control part causes the power-supply part to output the operation source voltage and causes the voltage generation part to output a reference potential (Vdt) for the power source stabilization capacitances in the display drive term; and the operation control part makes an output of the power-supply part a high impedance, and causes the voltage generation part to output the regulation voltages to allow the regulation voltages to be coupled to the outputs of the power-supply part by capacitive coupling in the non-display drive term.

This embodiment is arranged so that the operation power source to output to the panel module is lowered by capacitive coupling in the non-display drive term brings about the same effect and advantage as those achieved by the embodiment as described in [14].

[19] Examples of the Power-Supply Part and the Voltage Generation Part

In the display and touch sense panel unit as described in item [18], the power-supply part has: a power supply circuit (37C) operable to produce the first operation source voltage; and a power source switch circuit (39a, 39b) operable to select the output of the first operation source voltage from the power source output terminals or a high-output impedance state of the power source output terminals. The voltage generation part has: a voltage generation circuit (41C) operable to produce the regulation voltages; and a voltage switch circuit (43p, 43n) operable to selectively output the regulation voltages or the reference voltage from the voltage output terminal. The operation control part causes the power source switch circuits to select the output of the first operation source voltage, and the voltage switch circuit to select the output of the reference voltage in the display drive term; and the operation control part causes the power source switch circuits to select the high-output impedance state and the voltage switch circuit to select the output of the regulation voltages in the non-display drive term.

According to this embodiment, the output action of a power-supply part remains stopped in a non-display drive term, which contributes to the reduction in power consumption.

The effect achieved by the representative embodiment of the embodiments disclosed in the present application will be briefly outlined below.

On condition that a display frame period is divided to have display and non-display drive terms, even an input circuit node of a display panel, to which a constant voltage remains applied over a length of time longer than a display drive term in a non-display drive term never suffers an excessive voltage load on the node, and a temporal damage to a panel module can be avoided, which can contribute to the reduction in the degradation of the display performance or unevenness in display.

BRIEF DESCRIPTION OF THE DRAWINGS

FIG. 11 is a state transition diagram showing, by example, the state transition of power source control on the panel module by switch control.

DETAILED DESCRIPTION

Figure 1:
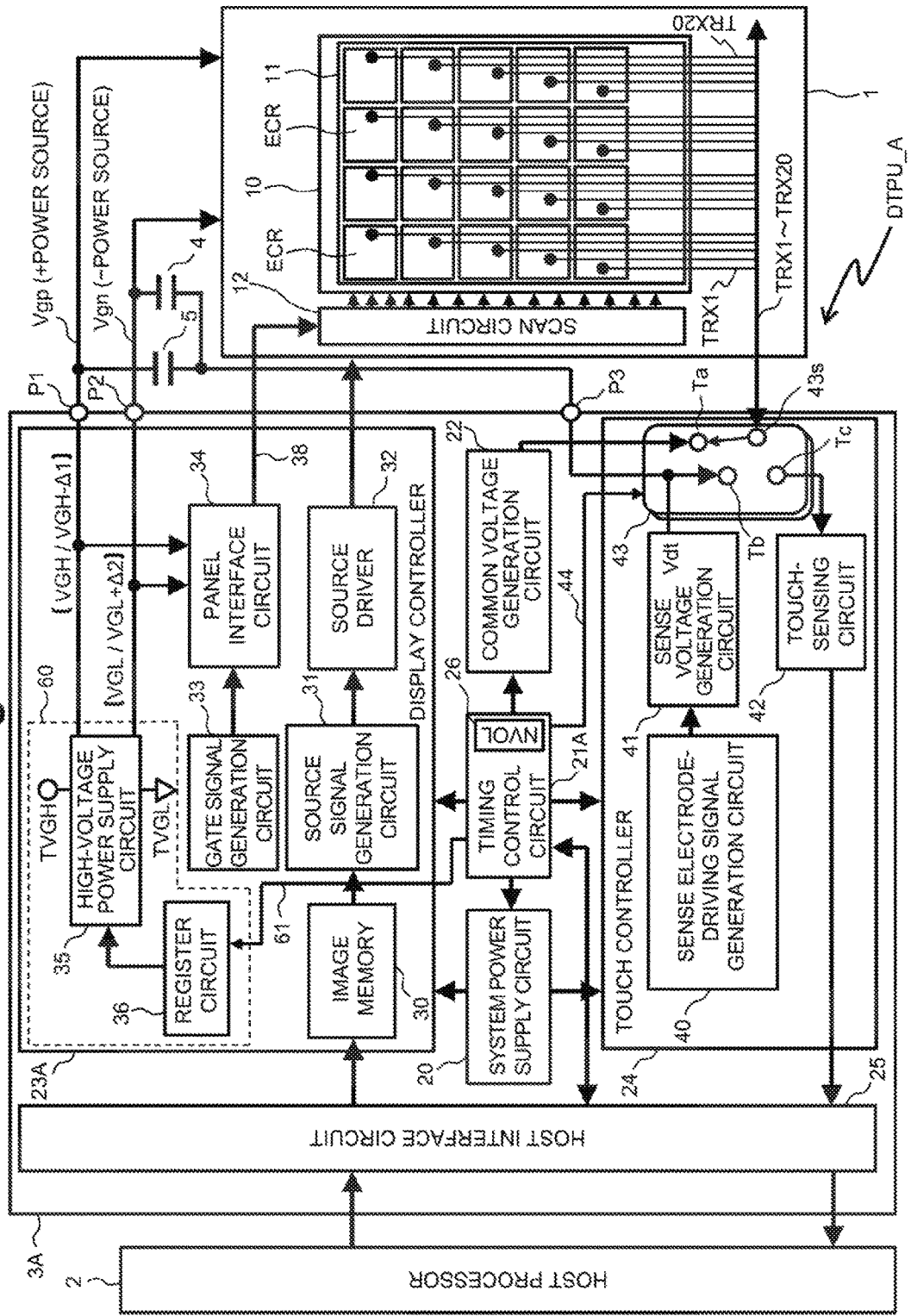
FIG. 1 is a block diagram showing a display and touch sense panel unit according to the first embodiment.

FIG. 1 shows, by example, a display and touch sense panel unit DTPU_A according to the first embodiment, which has a panel module 1 and a display control and touch control device 3A.

Figure 2:
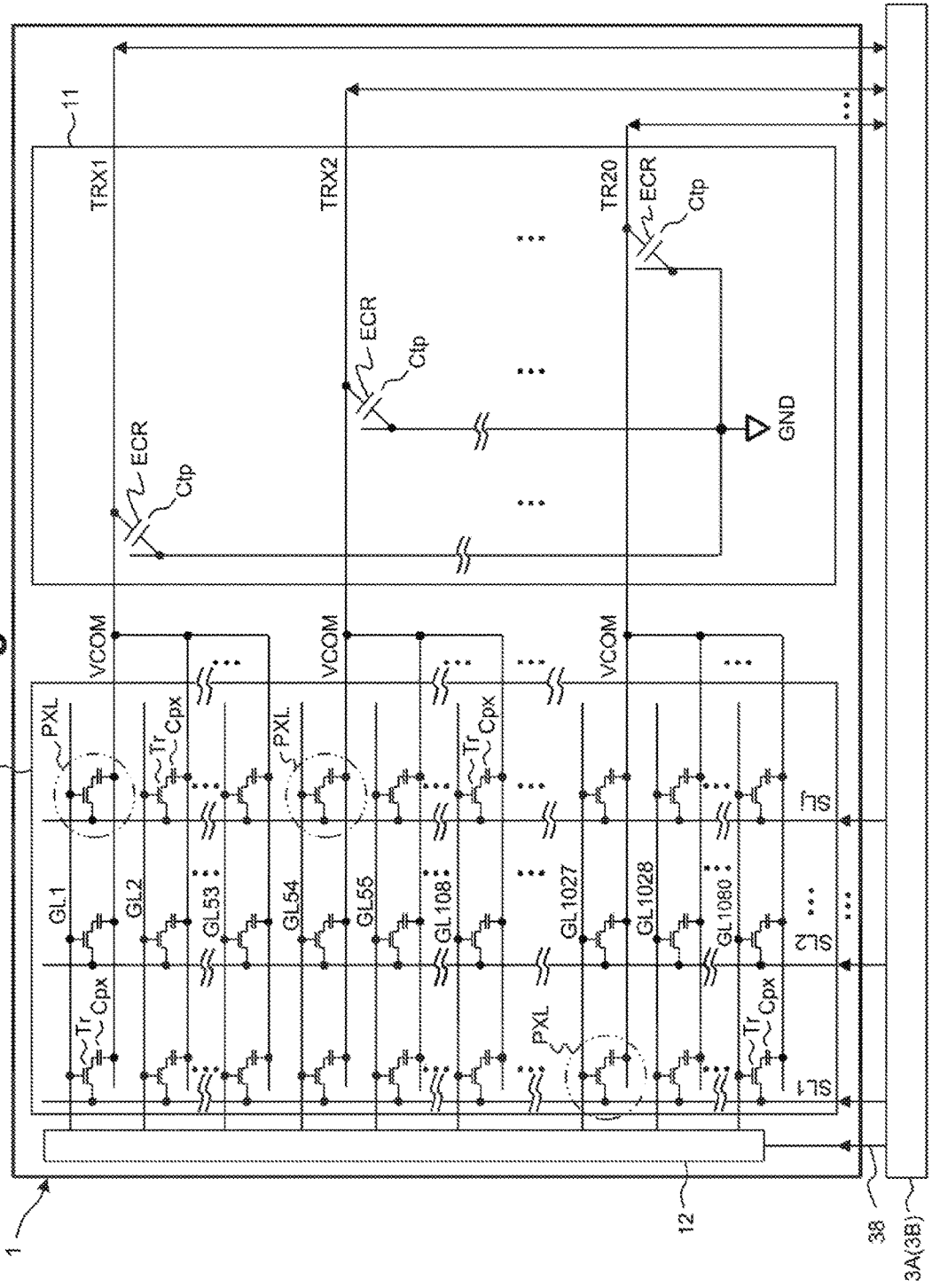
FIG. 2 is a circuit diagram schematically showing, by example, the circuit configuration of a panel module of an in-cell structure.

For instance, the panel module 1 is constructed in a so-called in-cell form in which a display panel 10 and a touch panel 11 are integrally incorporated as shown in FIG. 2; the display panel has a plurality of display elements PXL arranged like a matrix, and the touch panel has touch-sensing electrodes ECR forming sensing capacitances Ctp and arranged like a matrix at a density lower than that of the plurality of display elements PXL. The in-cell form structure has, for example, a TFT array substrate arranged by disposing TFTs and pixel electrodes, constituting display elements PXL, on a glass substrate like a matrix, which is formed by stacking the following on the TFT array substrate, and it includes a liquid crystal layer, a common electrode layer opposed to the pixel electrodes, a color filter, touch-sensing electrodes making sensing capacitances, and a surface glass which are stacked on the TFT array substrate. While the display panel 10 and the touch panel 11 are separately shown on the left and right sides respectively in FIG. 2 for the sake of convenience, they are put on each other in fact.

Although no special restriction is intended, the display panel 10 has a plurality of display elements PXL, scan electrodes GL1 to GL1080 serving as gate lines, and signal electrodes SL1 to SLj (j is a positive integer) which are arranged to cross each other according to the embodiment of FIG. 2. The plurality of display elements each have a thin film transistor Tr, called TFT, which is disposed at a corresponding intersection point of the scan and signal electrodes, and include a combination of a liquid crystal element and a storage capacitor (the liquid crystal element and the storage capacitor are representatively shown in the diagram as one capacitor Cpx in combination) making a sub-pixel between the drain of the thin film transistor Tr and the common electrode VCOM; the scan electrodes GL1 to GL1080 are provided to bind to gates of the respective thin film transistors Tr; and the signal electrodes SL1 to SLj are provided to bind to sources of the respective thin film transistors Tr. Lines of pixels running along the scan electrodes GL1 to GL1080 respectively are each referred to as "scan line" or "display line". In display control, the scan electrodes GL1 to GL1080 are driven in turn; and the thin film transistors Tr are turned on for each scan electrode and an electric current is caused to flow between the source and drain of each thin film transistor thus activated. During this time, signal voltages (gradation signals) which are put on the sources of the thin film transistors through the signal electrodes SL1 to SLj are applied to the respective liquid crystal elements Cpx, whereby the state of the liquid crystal is controlled. The panel module 1 includes a scan circuit 12 which sequentially drive the scan electrodes GL1 to GL1080.

Although no special restriction is intended, the touch panel 11 is one arranged based on, of electrostatic capacitance techniques, a self-capacitance technique, and the touch-sensing electrodes ECR are arranged like a matrix as shown in FIG. 1. The touch-sensing electrodes ECR are connected to touch-sensing signal lines TRX1 to TRX20 respectively. The counter electrodes to the individual touch-sensing electrodes ECR form respective stray capacitances, and commonly connected to the ground terminal GND of the circuit. Although no special restriction is intended, in the embodiment of FIG. 2 the common electrode of the touch panel is divided in 20; and the resultant common electrodes VCOM are each shared by 54 display lines. The common electrodes VCOM are arranged to double as the touch-sensing signal lines TRX1 to TRX20 respectively, whereby the panel module 1 is reduced in thickness. For instance, the stray capacitance of the touch-sensing electrodes ECR is charged through the touch-sensing signal lines TRX1 to TRX20. A finger brought close to the touch-sensing electrodes increases the corresponding stray capacitance. The quantity of electricity thus charged is re-distributed between the touch-sensing electrode and a reference capacitance of a touch-sensing circuit, and the presence or absence of a touch can be sensed by the length of a discharge time of the re-distributed quantity of electricity. By using the touch panel 11 superposed on the display panel 10, a touch operation performed on the touch panel 11 according to a screen display of the display panel 10 can be determined from a touch coordinate of a touch operation in the event of the touch operation.

Although no special restriction is intended, the display control and touch control device 3A is constructed as a one-chip semiconductor integrated circuit formed on a semiconductor substrate. It is formed on e.g. a semiconductor substrate such as a bulk single crystal silicon by a known CMOS integrated circuit manufacturing technique or the like.

Figure 5:
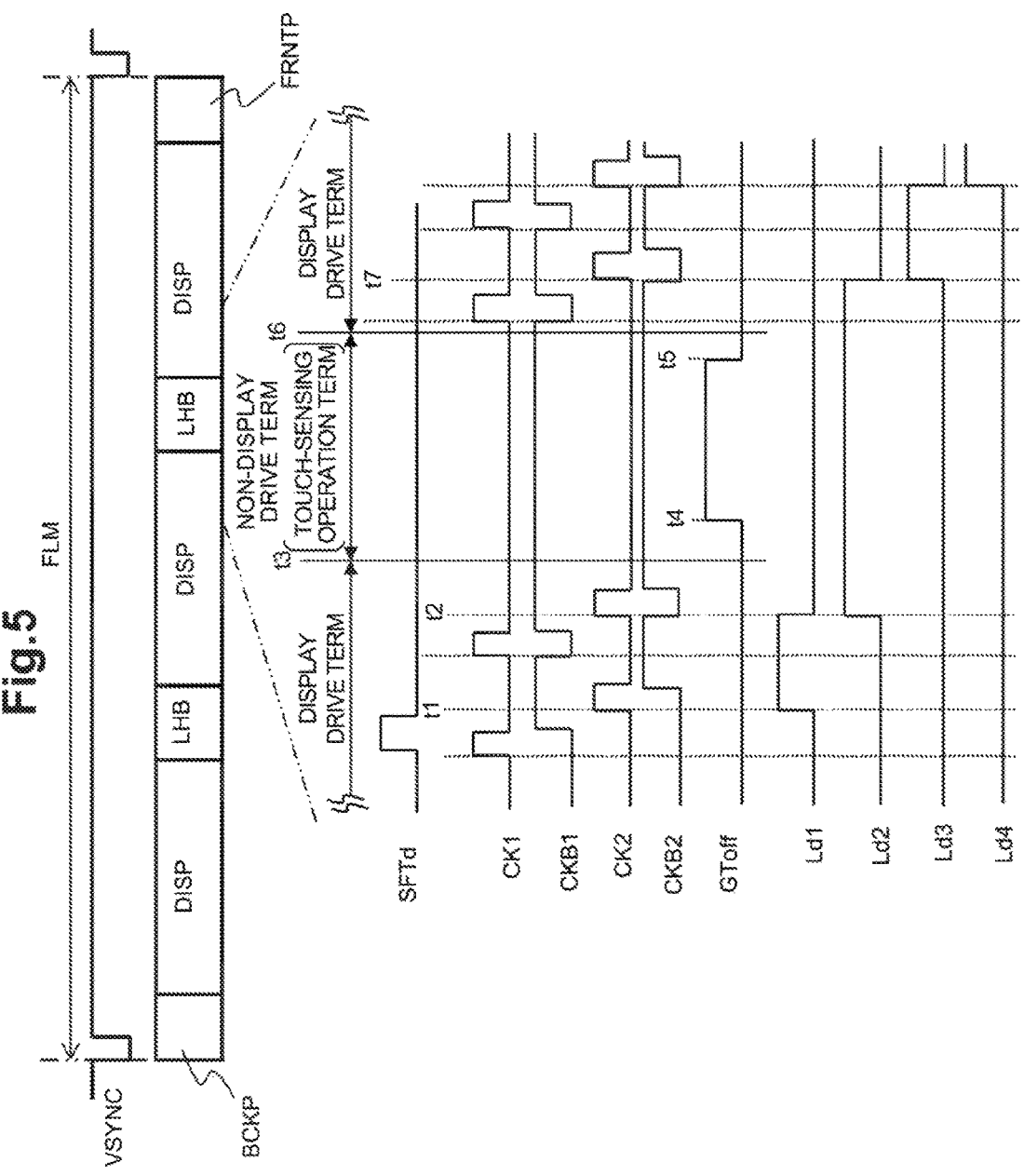
FIG. 5 is a timing chart showing, by example, the action timing of the scan circuit of the panel module of FIG. 3.

Although no special restriction is intended, the display control and touch control device 3A has a display control part (also, hereinafter referred to as "display controller") 23A, a touch control part (also, hereinafter referred to as "touch controller") 24, an operation control part (also, hereinafter referred to as "timing control circuit") 21A which creates a display drive term and a non-display drive term, and performs the timing control and the like, a common voltage generation circuit 22 which produces a common voltage to provide to the common electrodes VCOM, a system power supply circuit 20, and a host interface circuit 25, and it is mounted on the TFT substrate of the panel module 1 in a COG (Chip on Glass) form or the like. For instance, in a display frame period FLM defined by the cycle of a frame synchronizing signal VSYNC such as a vertical synchronizing signal, display and non-display drive terms are disposed between a back porch BCKP at the top of the display frame period, and a front porch FRNTP at the end thereof in such a way that the non-display drive term LHB is sandwiched between the display drive terms DISP, as shown in FIG. 5, by example. The display control and touch control device 3A is connected through the host interface circuit 25 to the host processor 2 of an information terminal device, e.g. a smart phone, which includes the panel module 1 as a user interface, and performs the input/output of an action command, display data, touch sensing coordinate data, etc. on the host processor 2. The system power supply circuit 20 produces an internal power source for logic use and a middle voltage for driving use based on a source voltage supplied from outside.

The display controller 23A has an image memory 30 such as a frame buffer memory, a source signal generation circuit 31, a source driver 32, a gate signal generation circuit 33, a panel interface circuit 34, and a power-supply part 60, and performs the control to select the display elements PXL for each scan line, and the display driving of the selected display elements in a display drive term. Specifically, the gate signal generation circuit 33 generates a timing signal to sequentially select the scan electrodes GL1 to GL1080 in a display drive term, which is output from the panel interface circuit 34 to the scan circuit 12. The power-supply part 60 generates a high-voltage power source Vgp, Vgn of positive and negative polarities to supply through power source output terminals P1 and P2 to the panel interface circuit 34 and the display panel 11.

Display data, including bit map data and video data, which are supplied to the host interface circuit 25 from the host processor 2 are once accumulated in the image memory 30 as required and supplied to the source signal generation circuit 31. The source signal generation circuit 31 latches image data input thereto for each scan line by a line latch (not shown). The source driver 32 receives latch data from the line latch, produces gradation signals of gradation voltages according to the latch data for each scan line, and outputs the gradation signals to the signal electrodes SL1 to SLj in parallel in synchronization with the select of the scan line.

The touch controller 24 has a sense electrode-driving signal generation circuit 40, a sense voltage generation circuit 41, a touch-sensing circuit 42 and a select circuit 43, and performs a touch-sensing action with the touch-sensing electrodes ECR in a non-display drive term. The select circuit 43 has terminals Ta, Tb, Tc and 43s. Although no special restriction is intended, the terminals 43s are prepared as separate ones corresponding to the touch-sensing signal lines TRX1 to TRX20; the terminals Tc are prepared as separate ones corresponding to the respective terminals 43s; the terminal Ta is arranged to be common to the individual terminals 43s; and the terminal Tb is also arranged to be common to the individual terminals 43s. In a display drive term, the terminal Ta is connected to the terminals 43s, whereby the common voltage is supplied to the common electrodes VCOM in common. In a non-display drive term, the terminal Tb is connected to the terminals 43s first. Then, the stray capacitance of the respective touch-sensing electrodes ECR is charged by a sense voltage (reference potential) Vdt output by the sense voltage generation circuit 41 through the touch-sensing signal lines TRX1 to TRX20. Second, the terminals Tc are individually connected to the corresponding terminals 43s, whereby a quantity of electricity charged to the touch-sensing electrodes ECR is re-distributed between the stray capacitance and the reference capacitance of the touch-sensing circuit 42, and the presence or absence of a touch is sensed by the length of the discharge time of the re-distributed electricity. The sensing action may be performed sequentially on the touch-sensing electrodes ECR. The host processor 2 takes the result of sensing through the host interface circuit 25. The connections of the terminals Ta, Tb and Tc with the terminals 43s are controlled by select signals 44 which the timing control circuit 21A outputs according to a display drive term and a non-display drive term.

Although no special restriction is intended, the display panel 10 is arranged so that it is subjected to the driving of a positive polarity and the driving of a negative polarity alternately in order to prevent the display elements PXL from being degraded with time. For this purpose, the panel module 1 is supplied with a high-voltage power source Vgp of the positive polarity and a high-voltage power source Vgn of the negative polarity as an operation power source. The capacitance 5 externally attached to the device 3A is a stabilization capacitance for the high-voltage power source Vgp of the positive polarity. Likewise, the capacitance 4 is a stabilization capacitance for the high-voltage power source Vgn of the negative polarity. The capacitance 5 which receives the high-voltage power source Vgp of the positive polarity at one capacitive electrode, and the capacitance 4 which receives the high-voltage power source Vgn of the negative polarity at one capacitive electrode have the other capacitive electrodes commonly connected to the terminal Tb through the external terminal P3; the sense voltage Vdt is supplied to the other capacitive electrodes as a reference voltage. The source voltages are prevented from being influenced by the fluctuation in the ground potential by using the sense voltage Vdt as the reference voltage instead of the ground potential. Thus, the source voltages are stabilized in this aspect.

Now, the measure taken to avoid that an excessive large voltage is applied to the scan circuit 12 during a non-display drive term will be described assuming what has been described above.

Figure 3:
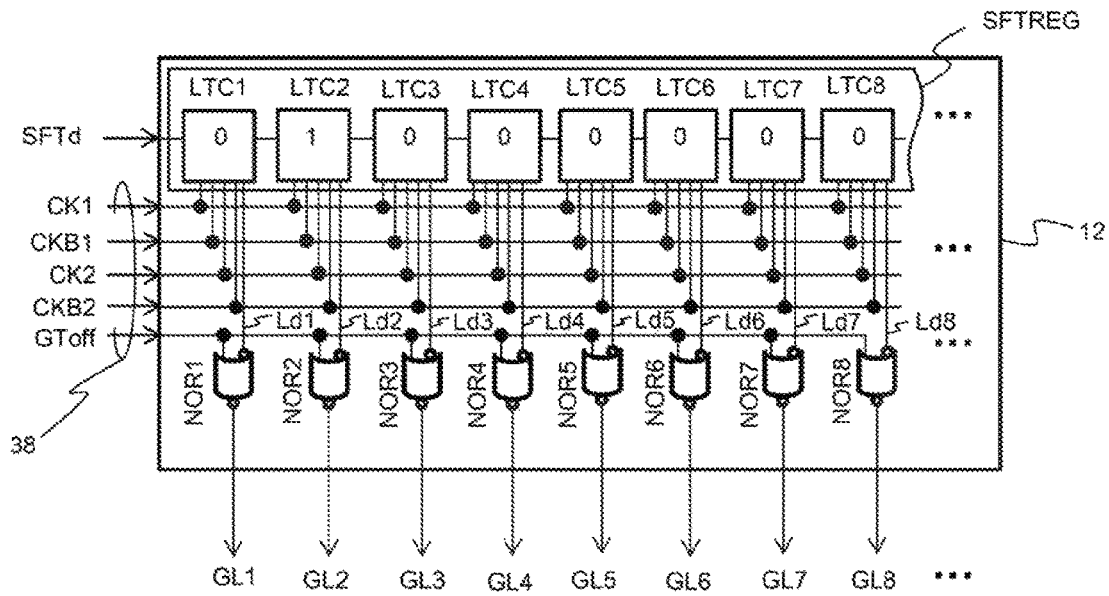
FIG. 3 is a block diagram showing an embodiment of a scan circuit of the panel module.

The scan circuit 12 has, as in the example shown by FIG. 3, a shift register SFTREG which shifts shift data SFTd to a later stage in synchronization with the change in pairs of shift clock signals CK1, CKB1, CK2 and CKB2, of which each pair consists of complementary clocks, and gate drivers NOR1 to NOR1080 which receive outputs from shift stages (also, referred to as "latch stages") LTC1 to LTC1080 of the shift register SFTREG, and outputs select signals for the scan electrodes GL1 to GL1080. Although no special restriction is intended, the gate drivers NOR1 to NOR1080 are composed of NOR gate circuits, and the shift stages LTC1 to LTC1080 are composes of master and slave latches. To one input terminals of the gate drivers NOR1 to NOR1080, a shift-suppressing pulse signal GToff for stopping the action for shifting shift data SFTd is supplied in common. To the other input terminals of the gate drivers NOR1 to NOR1080, inverted signals of outputs Ld1 to Ld1080 of the corresponding shift stages LTC1 to LTC1080 are supplied respectively. In FIG. 1 and other diagrams, the shift clock signals CK1, CKB1, CK2 and CKB2 and the shift-suppressing pulse signal GToff are labeled with the reference numeral 38 collectively.

Figure 4:
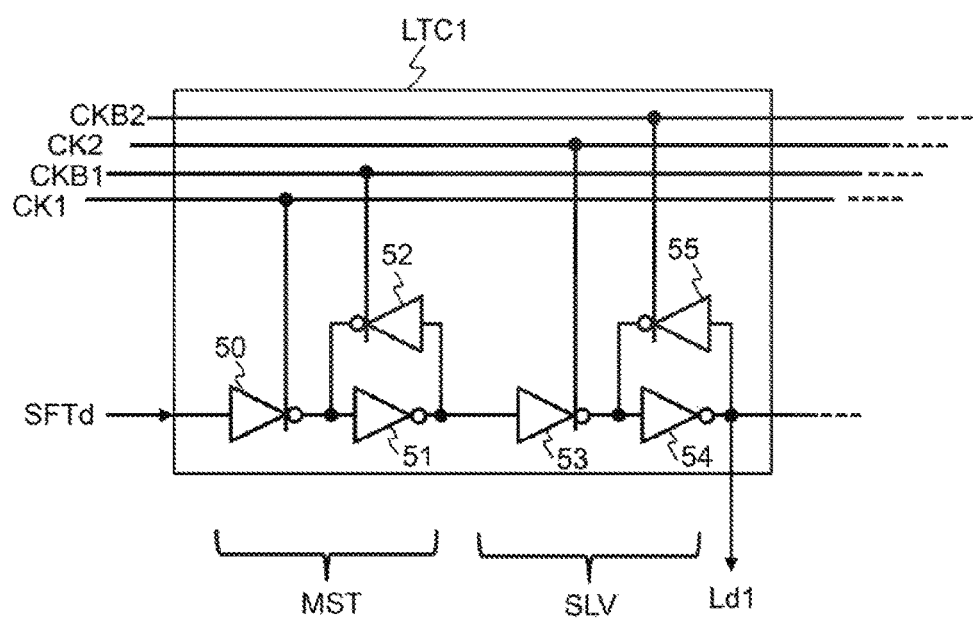
FIG. 4 is a block diagram showing master and slave latch circuits that the scan circuit has.

Although no special restriction is intended, the shift stage LTC1 includes a master stage MST arranged by connecting an input inverter 50 in series to inverters 51 and 52 connected reversely in parallel with each other, and a slave stage SLV arranged by connecting an input inverter 53 in series to inverters 54 and 55 connected reversely in parallel with each other as in the example shown by FIG. 4. The inverters 50, 52, 53 and 55 are each composed of a clocked inverter. The inverter 50 is allowed to output by a high level of the clock signal CK1, and it is made a high-output impedance (Hz) by a low level. Also, the other inverters 52, 53 and 55 are allowed to output by the high level of the respective clock signals CKB1, CK2 and CKB2, and they are made a high-output impedance (Hz) by the low level. The remaining shift stages LTC2 to LTC1080 are arranged likewise.

FIG. 5 shows, by example, part of action waveforms of the scan circuit 12 in a display drive term DISP and a non-display drive term LHB. As shown in the timing chart, in a display drive term, the shift clock signals CK1, CKB1, CK2 and CKB2 are changed in clock with a predetermined frequency and the shift-suppressing pulse signal GToff remains negated at a low level so that a one-frame period FLM satisfies 60 Hz. In the latch stage LTCi, the master stage MST latches shift data SFTd from the preceding stage and then, the slave stage SLV accepts the input and holds the latched shift data; in a latch time (t1–t2) during which the slave stage SLV holds the latched shift data, the latch stage LTCi makes its output Ld1 the high level. Specifically, the outputs of the latch stage Ld1 of the first stage to the latch stage Ld1080 of the final stage are changed to the high level in turn in every cycle of the shift clock signal CK2. The non-display drive term is started in the latch time of the slave stage SLV, during which the supply of the shift clock signals CK1, CKB1, CK2 and CKB2 to the scan circuit 12 is stopped and the latch state of each slave stage SLV is maintained as it is. The panel interface circuit 34 asserts the shift-suppressing pulse signal GToff into the high level in synchronization with the clock signal CK2 in a non-display drive term. For instance, in case that the non-display drive term is started at the time t3, the shift-suppressing pulse signal GToff is asserted into the high level at the time t4.

With the shift-suppressing pulse signal GToff kept at the high level, the output of the corresponding gate driver NOR2 is inverted into the low level even if the output of the slave stage SLV which latches shift data of a logical value of one (1) is at the high level. Therefore, the gate line using the output of the slave stage SLV which latches shift data of the logical value of one (1) is deselected in a term during which the shift-suppressing pulse signal GToff stays at the high level. As a result, all the gate lines GL1 to GL1080 are deselected, and all the display elements hold gradation information right before the non-display drive term. Incidentally, in terminating the non-display drive term (t6), the panel interface circuit 34 previously negates the shift-suppressing pulse signal GToff into the low level in synchronization with the cycle of the clock signal CK2 (t5) and resumes the supply of the shift clock signals CK1, CKB1, CK2 and CKB2.

In this embodiment, the duration of the high-level output Ld2 of the slave stage SLV which latches the shift data of the logical value of one (1) in the time t2 to t7 in FIG. 5 is made longer than that in a display drive term according to the non-display drive term. Such a longer duration of the high-level makes the input load on the gate driver NOR2 which receives the signal for the longer duration excessive.

To keep an excessive input load from being put on the gate drivers NOR1 to NOR1080, the display controller 23A makes the voltage of the high-voltage power source Vgp, Vgn for the panel module 1 variable, which is produced by the power-supply part 60; and the variable high-voltage power source Vgp, Vgn is used for an operation power source of the panel interface circuit 34. Specifically, as shown in FIG. 1, by example, the power-supply part 60 of the display controller 23A supplies the high-voltage power source Vgp, Vgn for the panel module 1. In a display drive term, the voltage (first operation source voltage VGH, VGL) of the high-voltage power source Vgp, Vgn is given by e.g. VGH=15 V and VGL=−15 V. In a non-display drive term, the voltage (second operation source voltage VGH−Δ1, VGL+Δ2) of the high-voltage power source Vgp, Vgn is smaller than that in the display drive term in absolute value, which is given by e.g. VGH−Δ1=7 V and VGL+Δ2=−7 V (where −Δ1=−8 V and +Δ2=8 V). In this case, the amplitudes of the signals 38 including the shift-suppressing pulse signal GToff output by the panel interface circuit 34, and the shift clock signals CK1, CKB1, CK2 and CKB2 are comparable to the voltage of the high-voltage power source Vgp, Vgn; the amplitudes of gradation signals output by the source driver 32 are within a range of ±5 V to the ground GND, and the common voltage VCOM output by the common voltage generation circuit 22 is 0-5 V.

The power-supply part 60 has: a register circuit 36 on which voltage-set data are rewritably set by the timing control circuit 21A; and a high-voltage power supply circuit 35 which produces a power source with a voltage according to the voltage-set data set on the register circuit 36. The high-voltage power supply circuit 35 includes e.g. a voltage regulator or resistance-type potential dividing circuit, which uses a high voltage of a positive high-voltage power source terminal TVGH, and a high voltage of a negative high-voltage power source terminal TVGH as an operation power source, to produce a first operation source voltage VGH, VGL and a second operation source voltage VGH−Δ1, VGL+Δ2. Although no special restriction is intended, the high voltage of the positive high-voltage power source terminal TVGH, and the high voltage of the negative high-voltage power source terminal TVGH are given by an external power source supplied from outside the device 3A.

Figure 6:
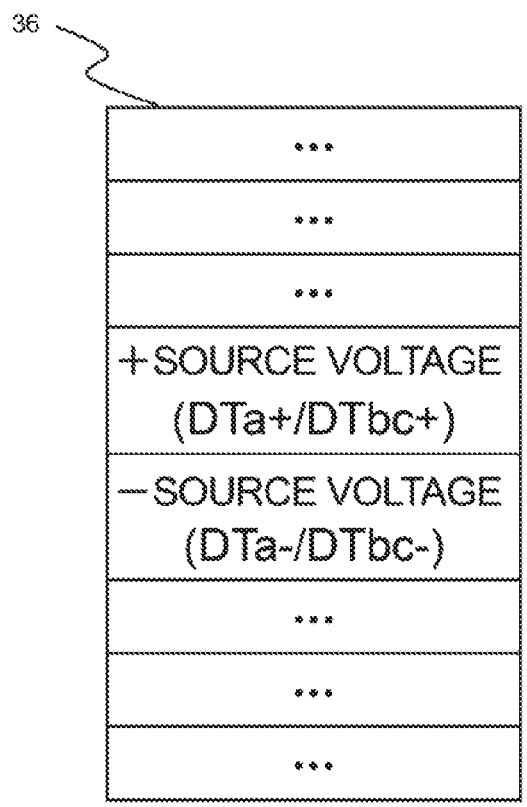
FIG. 6 is an explanatory diagram showing an embodiment of a register circuit.

The timing control circuit 21A sets the first voltage-set data DTa+, DTa− for specifying the first operation source voltage VGH, VGL on the register circuit 36 in a display drive term, and it sets the second voltage-set data DTbc+, DTbc− for specifying the second operation source voltage VGH−Δ1, VGL+Δ2 on the register circuit 36 in a non-display drive term. In FIG. 1, the reference numeral 61 generically denotes set signals that the timing control circuit 26 sets on the register circuit 36. Although no special restriction is intended, the data set region of the register circuit 36 for voltage-set data is divided into +source voltage regions and −source voltage regions as shown in FIG. 6, by example. The first voltage-set data DTa+, DTa−, and the second operation source voltage VGH−Δ1, VGL+Δ2 which are to be set on the register circuit 36 may be down loaded from the host processor 2 to a work memory (not shown) and set on an as-needed basis. Alternatively, the first voltage-set data DTa+, DTa− and the second operation source voltage VGH−Δ1, VGL+Δ2 may be written into the nonvolatile memory (NVOL) 26 in advance in the stage of manufacturing the display control and touch sensing device 3A or the stage of assembling the display and touch sense panel unit DTPU_A, and used for register setting, given that the timing control circuit 21A is provided with a nonvolatile memory (NVOL) 26 as shown in FIG. 1.

Figure 7:
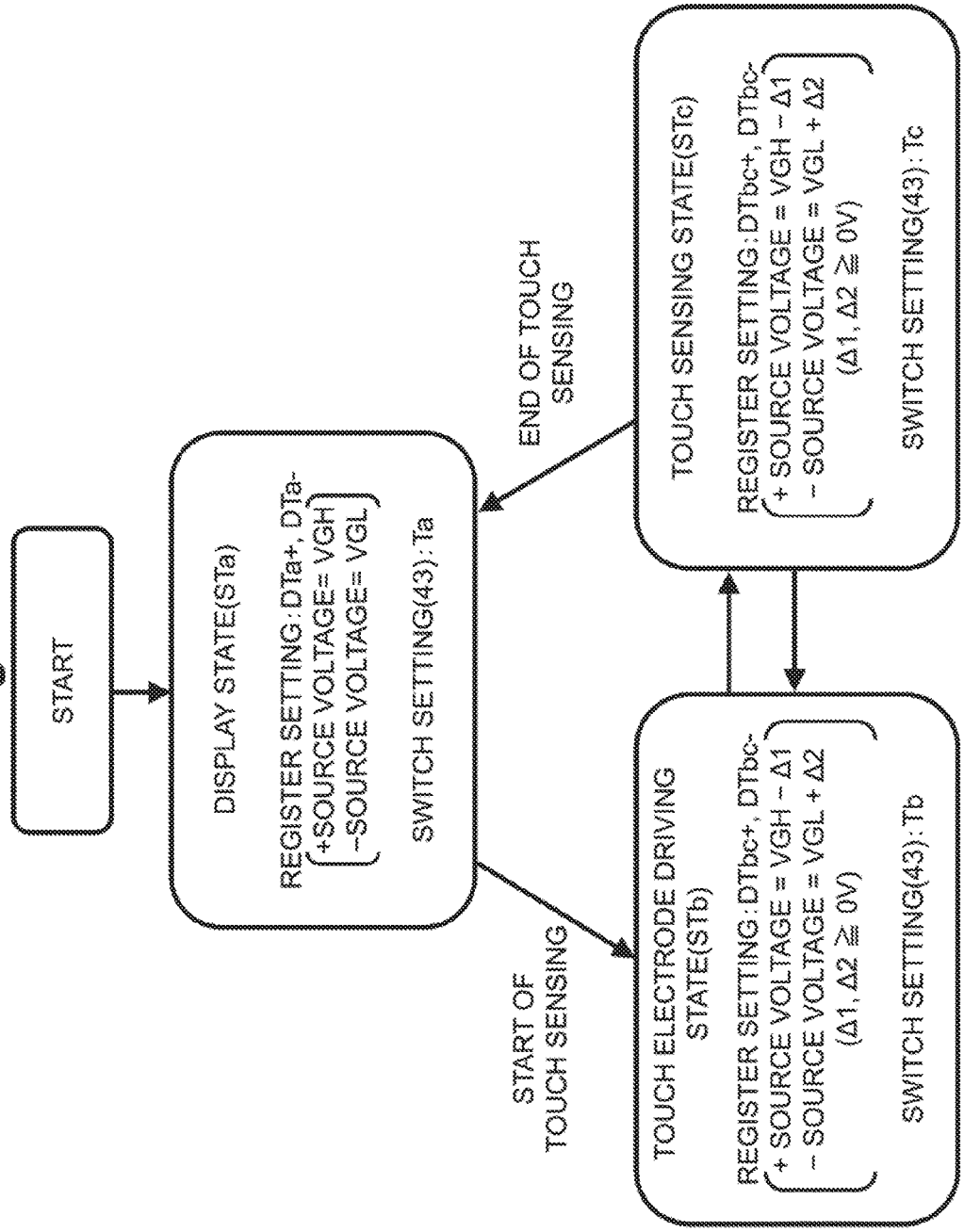
FIG. 7 is a state transition diagram showing, by example, the state transition of power source control on the panel module by register control.

Now, the transition of the state of power source control by the control of register setting of the voltage-set data will be described with reference to FIG. 7. In a display drive term, the control state is a display state (STa), first voltage-set data DTa+, DTa− are set on the register circuit 36, and the high-voltage power source Vgp, Vgn is the first operation source voltage VGH, VGL. In this time, the terminals 43s of the switch circuit 43 are connected to the terminal Ta.

In a non-display drive term, in the case of starting the touch sensing, the control state is first made a touch electrode-driving state (STb) for charging the stray capacitance of the touch-sensing electrodes ECR; and then, the control state is made a touch sensing state (STc) for re-distributing a quantity of electricity thus charged and measuring a discharge time. In the case of terminating the touch sensing, the control state transitions into the display state (STa). In the case of repeating the touch sensing, the touch electrode-driving state (STb) and the touch sensing state (STc) are repeated. In the touch electrode-driving state (STb), the second voltage-set data DTbc+, DTbc− are set on the register circuit 36; and the high-voltage power source Vgp, Vgn is made the second operation source voltage VGH−Δ1, VGL+Δ2. In this time, the terminals 43s of the switch circuit 43 are connected to the terminal Tb. In the touch sensing state (STc), the second voltage-set data DTbc+, DTbc− are set on the register circuit 36; and the high-voltage power source Vgp, Vgn is made the second operation source voltage VGH−Δ1, VGL+Δ2. In this time, the terminals 43s of the switch circuit 43 are connected to the terminals Tc.

The first embodiment brings about the effect as follows.

In the case of performing display and touch-sensing actions on condition that a display frame period FLM is divided to have a plurality of display drive terms DISP and a plurality of non-display drive terms HLB, the voltage of the operation power source Vgp, Vgn supplied to the panel module 1 during a non-display drive term HLB in which the touch sensing is performed is the voltage VGH−Δ1, VGL+Δ2, which is smaller, in absolute value, than the operation source voltage VGH, VGL supplied during a display period. Therefore, the second operation source voltage VGH−Δ1, VGL+Δ2 smaller than the first operation source voltage VGH, VGL in absolute value is supplied to the inputs of the gate drivers NOR1 to NOR1080 in a term longer than the display term as a result of the stop of the display action. So, unlike the input load when the first operation source voltage VGH, VGL is supplied, the input load on the gate drivers NOR1 to NOR1080 never becomes excessively large, and the degradation of the input characteristic of the gate drivers NOR1 to NOR1080 never adversely affects the display performance.

In addition, the first operation source voltage VGH, VGL, and the second operation source voltage VGH−Δ1, VGL+Δ2 can be made variable by register setting. Therefore, the display control and touch control device 3A can flexibly adapt to panel modules different in the characteristic or endurance according to a power source voltage.

Because of having a nonvolatile memory 26 operable to rewritably hold the first voltage-set data and second voltage-set data, the timing control part need not receive the first voltage-set data and second voltage-set data from the host processor 2 in operation.

Figure 8:
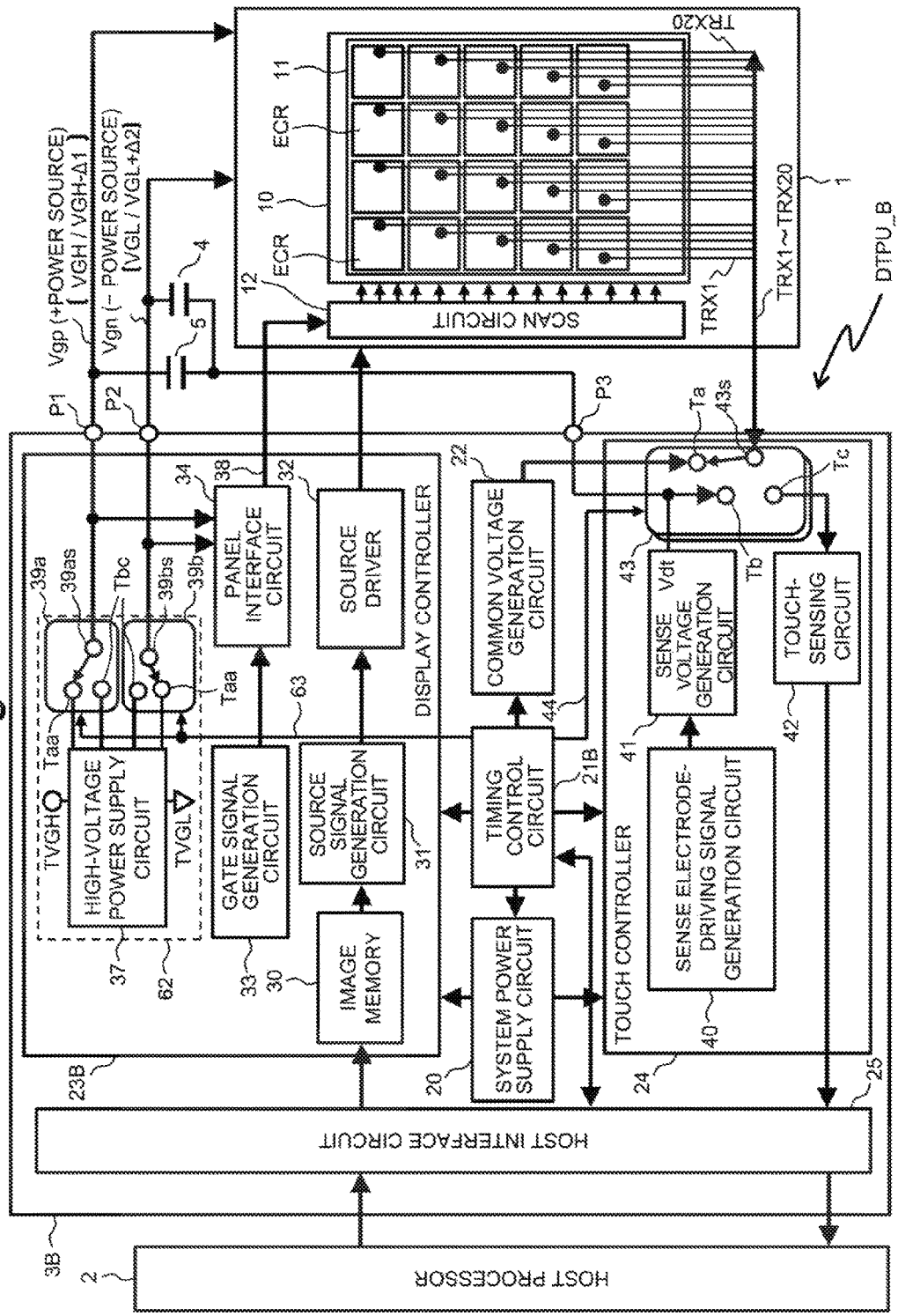
FIG. 8 is a block diagram showing a display and touch sense panel unit according to the second embodiment.

FIG. 8 shows, by example, a display and touch sense panel unit DTPU_B according to according to the second embodiment, which has a panel module 1 and a display control and touch control device 3B. The display control and touch control device 3B is different from the display control and touch control device 3A in the power-supply part 62. The power-supply part 62 switches the voltage of the high-voltage power source Vgp, Vgn by means of switch control. Specifically, the power-supply part 62 has: a high-voltage power supply circuit 37 which produces the first operation source voltage VGH, VGL and the second operation source voltage VGH−Δ1, VGL+Δ2; and switch circuits 39a and 39b which selectively output the first operation source voltage VGH, VGL or the second operation source voltage VGH−Δ1, VGL+Δ2 produced by the high-voltage power supply circuit 37. The high-voltage power supply circuit 37 includes a voltage regulator or resistance-type potential dividing circuit, which uses e.g. the high voltage of a positive high-voltage power source terminal TVGH, and the high voltage of a negative high-voltage power source terminal TVGH as an operation power source to produce the first operation source voltage VGH, VGL and the second operation source voltage VGH−Δ1, VGL+Δ2. Although no special restriction is intended, the high voltage of the positive high-voltage power source terminal TVGH, and the high voltage of the negative high-voltage power source terminal TVGH come from an external power source to be supplied from outside the device 3B.

The timing control circuit 21B controls the switch circuits 39a and 39b to select the first operation source voltage VGH, VGL in a display drive term DISP, and it controls the switch circuits 39a and 39b to select the second operation source voltage VGH−Δ1, VGL+Δ2 in a non-display drive term. While the voltage values of the first operation source voltage VGH, VGL and the second operation source voltage VGH−Δ1, VGL+Δ2 cannot be made programmable by register setting, the first operation source voltage VGH, VGL and the second operation source voltage VGH−Δ1, VGL+Δ2 can be easily switched by operating the switch circuits 39a and 39b.

Figure 9:
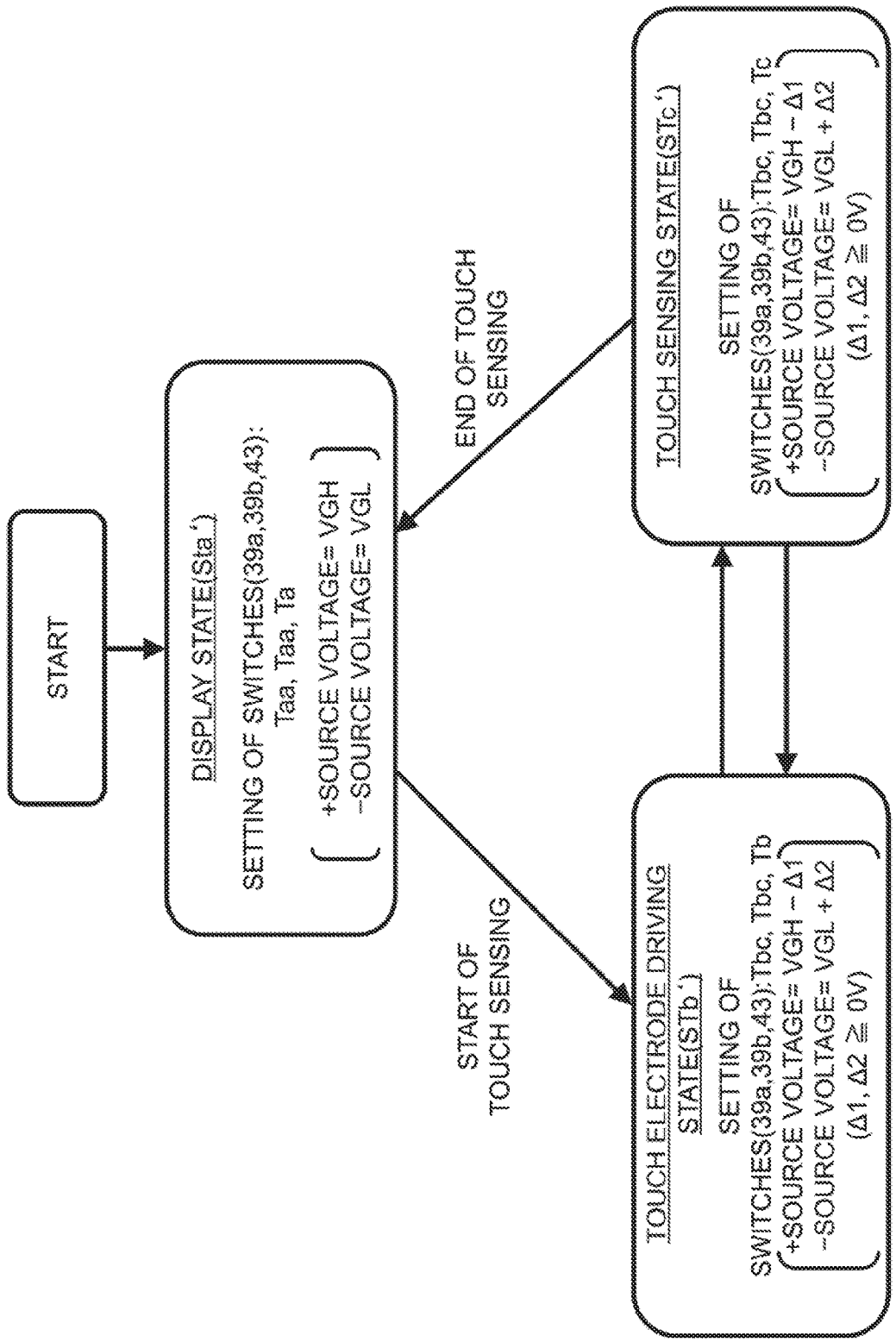
FIG. 9 is a state transition diagram showing, by example, the state transition of power source control on the panel module by switch control.

The transition of the state of power source control by the switch control of the switch circuits 39a and 39b will be described with reference to FIG. 9. In a display drive term, the control state is made a display state (STa'), the terminal 39as of the switch circuit 39a connected to the terminal Taa, and the terminal 39bs of the switch circuit 39b is connected to the terminal Taa; and the high-voltage power source Vgp, Vgn is made the first operation source voltage VGH, VGL. In this time, the terminals 43s of the switch circuit 43 are connected to the terminal Ta.

In the case of starting the touch sensing in a non-display drive term, the control state is first made a touch electrode-driving state (STb') in which the stray capacitance of the touch-sensing electrodes ECR are charged and then, it is made a touch sensing state (STc') in which a quantity of electricity thus charged is re-distributed and the discharge time is measured. In terminating the touch sensing, the control state is caused to transition to the display state (STa'). In repeating the touch sensing, the touch electrode-driving state (STb') and the touch sensing state (STc') are repeated. In the touch electrode-driving state (STb'), the terminal 39as of the switch circuit 39a is connected to the terminal Tbc, and the terminal 39bs of the switch circuit 39b is connected to the terminal Tbc; and the high-voltage power source Vgp, Vgn is made the second operation source voltage VGH−Δ1, VGL+Δ2. In this time, the terminals 43s of the switch circuit 43 are connected to the terminal Tb. In the touch sensing state (STc'), the terminal 39as of the switch circuit 39a is connected to the terminal Tbc, and the terminal 39bs of the switch circuit 39b is connected to the terminal Tbc; and the high-voltage power source Vgp, Vgn is made the second operation source voltage VGH−Δ1, VGL+Δ2. In this time, the terminals 43s of the switch circuit 43 is connected to the terminal Tc.

The other parts of the structure may be the same as those in the first embodiment. So, constituents or members having the like functions are identified by the same reference numeral or the like and the detailed description thereof is omitted here. In the second embodiment, the input load on the gate drivers NOR1 to NOR1080 is kept from becoming excessively large as in the first embodiment. So, the degradation of the input characteristic of the gate drivers NOR1 to NOR1080 never adversely affects the display performance.

Figure 10:
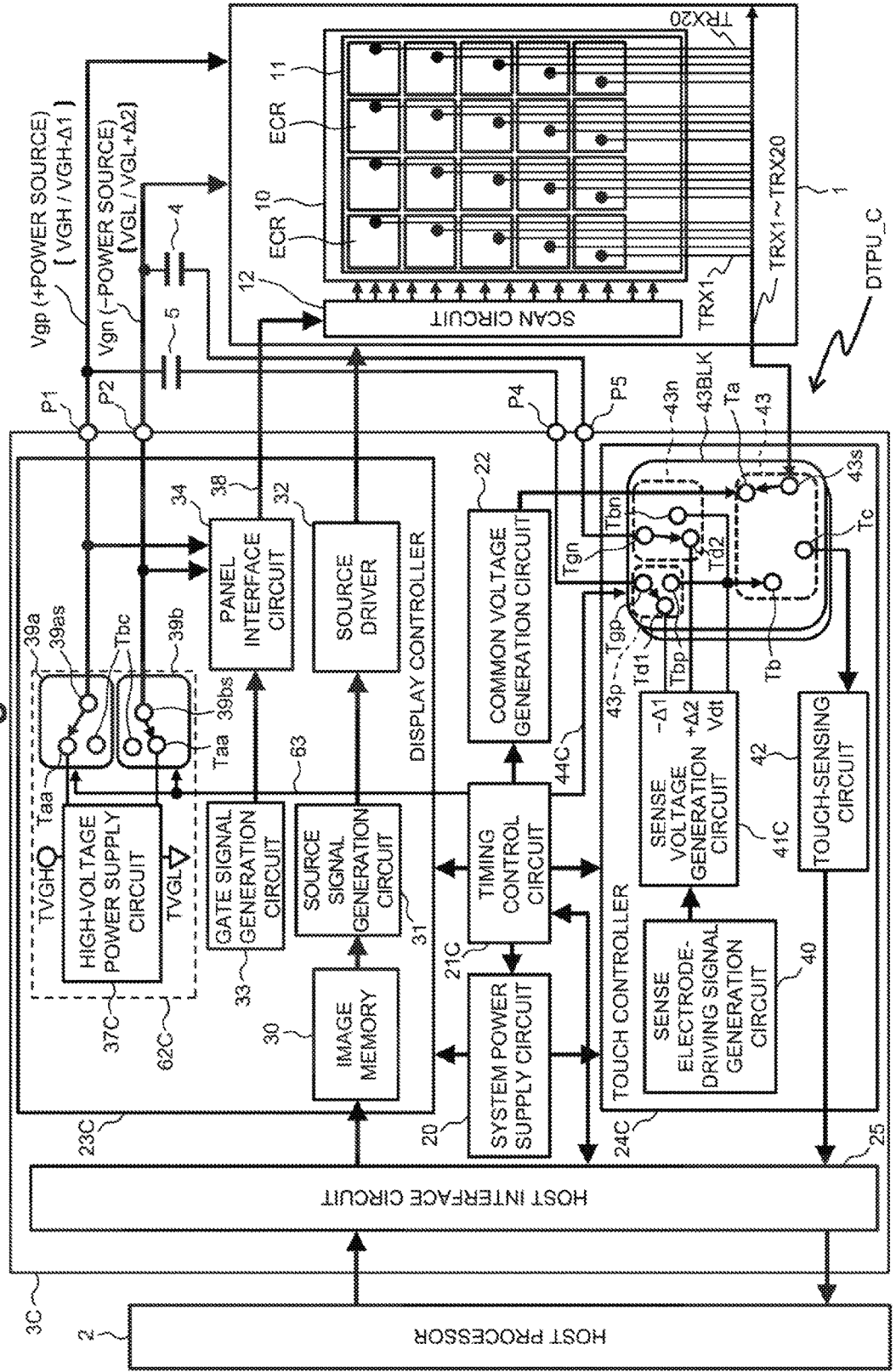
FIG. 10 is a block diagram showing a display and touch sense panel unit according to the third embodiment.

FIG. 10 shows, by example, a display and touch sense panel unit DTPU_C according to the third embodiment, which has a panel module 1 and a display control and touch control device 3C. The display control and touch control device 3C is different from the display control and touch control device 3B in the power-supply part 62C of the display controller 23C, and the sense voltage generation circuit 41C and the select circuit 43BLK of the touch controller 24C. In the third embodiment, the capacitive coupling by the stabilization capacitances 4 and 5 is used to selectively change the first operation source voltage VGH, VGL to the second operation source voltage VGH−Δ1, VGL+Δ2, which are smaller, in absolute value, than the first operation source voltages.

The display controller 23C has a power-supply part 62C which supplies the panel module 1 with the first operation source voltage VGH, VGL through the power source output terminals P1 and P2. The power-supply part 62C has: a high-voltage power supply circuit 37C which produces the first operation source voltage VGH, VGL; and power source switch circuits 39a and 39b for selecting the output of the first operation source voltage VGH, VGL from the power source output terminals P1 and P2, or the high-output impedance state of the power source output terminals P1 and P2.

The touch controller 24C has: a sense voltage generation circuit 41C as a voltage generation part; and a switch circuit block 43BLK. The sense voltage generation circuit 41C produces regulation voltages −Δ1 and +Δ2 in addition to the sense voltage (reference potential) Vdt. The switch circuit block 43BLK has, in addition to a switch circuit 43, a voltage switch circuit 43p which selectively outputs the regulation voltage −Δ1 or sense voltage Vdt from a voltage output terminal P4, and a voltage switch circuit 43n which selectively outputs the regulation voltage Δ2 or sense voltage Vdt from a voltage output terminal P5. According to the embodiment like this, the regulation voltages +Δ2 and −Δ1 are coupled to the power source terminals P1 and P2 through the power source stabilization capacitances 4 and 5 by capacitive coupling, whereby the second operation source voltage VGH−Δ1, VGL+Δ2 smaller than the first operation source voltage in absolute value can be produced. The high-voltage power supply circuit 37C includes e.g. a voltage regulator or resistance-type potential dividing circuit, which produces the first operation source voltage VGH, VGL by using, as operation power sources, a high voltage of the positive high-voltage power source terminal TVGH, and a high voltage of the negative high-voltage power source terminal TVGH. Although no special restriction is intended, the high voltage of the positive high-voltage power source terminal TVGH, and the high voltage of the negative high-voltage power source terminal TVGH are external power sources supplied from outside the device 3C.

The timing control circuit 21C controls, by a control signal 44C, the power source switch circuits 39a and 39b to output the first operation source voltage VGH, VGL and the voltage switch circuits 43p and 43n to output the sense voltage Vdt in display drive term DISP. Further, in a non-display drive term LHB, the timing control circuit 21C opens the power source switch circuits 39a and 39b (i.e. bringing the output of the power-supply part 62C to the high-impedance state), and causes the voltage switch circuits 43p and 43n to select the regulation voltages −Δ1 and +Δ2, and allows the regulation voltages −Δ1 and +Δ2 to couple to the source voltage VGH, VGL by the capacitive coupling by stabilization capacitances 5 and 4.

The transition of the state of power source control by switch control of the power source switch circuits 39a and 39b and the voltage switch circuits 43p and 43n will be described with reference to FIG. 11. In a display drive term, the control state is a display state (STa"), the terminal 39as of the switch circuit 39a is connected to the terminal Taa, and the terminal 39bs of the switch circuit 39b is connected to the terminal Taa; and the high-voltage power source Vgp, Vgn is made the first operation source voltage VGH, VGL. In this time, the terminals 43s of the switch circuit 43 are connected to the terminal Ta. In the display state (STa"), the terminal Tgp of the voltage switch circuit 43p is connected to the terminal Tbp, and the terminal Tgn of the voltage switch circuit 43n is connected to the terminal Tbn, whereby the other capacitive electrodes of the stabilization capacitances 4 and 5 are connected in common, and they receive the sense voltage Vdt. The sense voltage Vdt at this time is made a reference voltage instead of the ground to the stabilization capacitances 4 and 5.

In starting the touch sensing in a non-display drive term, the control state is first made the touch electrode-driving state (STb") in which the stray capacitance of the touch-sensing electrodes ECR is charged and then, the control state is made the touch sensing state (STc") in which a quantity of electricity thus charged is re-distributed and the discharge time is measured. In terminating the touch sensing, the control state is caused to transition to the display state (STa"). In the case of repeating the touch sensing, the touch electrode-driving state (STb") and the touch sensing state (STc") are repeated.

In the touch electrode-driving state (STb″), the terminals 43s of the switch circuit 43 are connected to the terminal Tb, and the sense voltage Vdt is supplied to the touch-sensing signal lines TRX1 to TRX20. In addition, the terminal 39as of the power source switch circuit 39a is connected to the terminal Tbc, and the terminal 39bs of the power source switch circuit 39b is connected to the terminal Tbc, whereby they are brought into the open state. The terminal Tgp of the voltage switch circuit 43p is connected to the terminal Td1, and the terminal Tgn of the voltage switch 43n is connected to the terminal Td2, whereby the regulation voltage $-\Delta 1$ is coupled to the stabilization capacitance element 5, and the regulation voltage $+\Delta 2$ is coupled to the stabilization capacitance 4. Thus, the high-voltage power source Vgp of the positive polarity becomes the second source voltage VGH$-\Delta 1$, and the high-voltage power source Vgn of the negative polarity becomes the second source voltage VGH$+\Delta 2$.

The touch sensing state (STc″) is different from the touch electrode-driving state (STb″) only in that the connection state of the switch circuit 43 is caused to transition to the connection state of the terminals 43s and terminal Tc.

The other parts of the structure are the same as those in the first embodiment. So, constituents or members having like functions are identified by the same reference numeral or the like and the detailed description thereof is omitted here.

In the third embodiment in which the operation power sources to be output to the panel module 1 is reduced by capacitive coupling in a non-display drive term, the input load on the gate drivers NOR1 to NOR1080 is not excessively large as in the first embodiment. So, the degradation of the input characteristic of the gate drivers NOR1 to NOR1080 never adversely affects the display performance.

Especially, the third embodiment is superior to the second embodiment in low power consumption. This is because the action of the power-supply part 62C outputting the source voltage VGH, VGL is stopped during a non-display drive term in the third embodiment.

While the invention made by the inventor has been described above based on the embodiments, it is not limited to the embodiments. It is obvious that various changes or modifications thereof may be made without departing from the subject matter thereof.

For instance, an on-cell structure may be adopted for the panel module, in which a touch panel is placed on a display panel. The touch control part may be arranged in a semiconductor integrated circuit separate from the display control part.

The gate driver of the scan circuit is not limited to a NOR gate. It is obvious that the gate driver can be replaced with another logic circuit or buffer circuit. The scan circuit is not limited to the structure shown in FIG. 3.

The number of the scan electrodes, the number of the signal electrodes, and the number of the touch-sensing electrodes are not limited to those in the above embodiments, which can be changed appropriately. The display panel is not limited to a liquid crystal display panel, and it may be an electroluminescence panel or the like.

The positive and negative high-voltage power sources are not limited to $\pm 15$ V. The first operation source voltage is not limited by the positive and negative high-voltage power sources, and it may be arranged by voltages of a single polarity. The voltages $\Delta 1$ and $\Delta 2$, defining the second operation source voltage, depend on the manufacturing process of the display panel and the transistor characteristics thereof. So, it is not actually profitable to specify the voltage values uniquely. It should be considered to be significant to specify the voltage values rather functionally within a range where the transistor off-leak current causes no trouble from a practical standpoint, i.e. a range where the display elements are allowed to keep gradation information. In that sense, with the display control and touch control device which is to be used for general purposes in various panel modules, the embodiment shown in FIG. 1, where the voltage values can be set appropriately by register setting is superior to the embodiment shown in FIG. 8.

What is claimed is:

1. A control device for an integrated display and touch panel module, the control device comprising:
   display control circuitry comprising power supply circuitry with power source output terminals, the power supply circuitry configured to supply, using voltage setting data rewriteably written to a register of the power supply circuitry, the panel module with a selected one of a first operation source voltage and a second operation source voltage using the power source output terminals, the second operation source voltage having a smaller amplitude than the first operation source voltage, wherein the display control circuitry is configured to drive, during a display drive term of a display frame period, selected display elements of the panel module;
   touch control circuitry configured to operate, during a non-display drive term of the display frame period, touch sensing electrodes of the panel module, wherein the touch control circuitry comprises a select circuit configured to couple, during a portion of the non-display drive term, the touch sensing electrodes with power source stabilization capacitances coupled to the power source output terminals; and
   timing control circuitry configured to:
      communicate timing control signals to the display control circuitry and to the touch control circuitry;
      write first voltage setting data to the register specifying the first operation source voltage to be supplied during the display drive term; and
      write second voltage setting data to the register specifying the second operation source voltage to be supplied during the non-display drive term.

2. The control device according to claim 1, wherein the display frame period comprises a plurality of display drive terms and one or more non-display drive terms arranged in an alternating pattern.

3. The control device according to claim 1, wherein the second operation source voltage comprises a voltage required for suppressing a change in gradation information held by unselected display elements of the panel module,
   wherein the timing control circuitry comprises a nonvolatile memory for rewritably storing the first voltage setting data and second voltage setting data.

4. The control device according to claim 1,
   wherein the display control circuitry has, for selective control of a plurality of display elements of the panel module, functions for outputting shift clock signals for defining an input action of series-connected master and slave latches forming a shift register and a latch action thereof, shift data to be supplied to the shift register, and a shift-suppressing pulse signal for stopping an action for shifting the shift data, and
   wherein the timing control circuitry causes the shift-suppressing pulse signal to make a pulse change in synchronization with the non-display drive term.

5. The control device according to claim 1, wherein the power supply circuitry is operable to produce the first operation source voltage and the second operation source voltage,
 wherein the power supply circuitry comprises a switch circuit operable to selectively output one of the first operation source voltage and the second operation source voltage, and
 wherein the timing control circuitry causes the switch circuit to select the first operation source voltage in the display drive term, and causes the switch circuit to select the second operation source voltage in the non-display drive term.

6. The control device according to claim 5, wherein the second operation source voltage comprises a voltage required for suppressing a change in gradation information held by unselected display elements of the panel module.

7. The control device according to claim 5, wherein the display control circuitry has, for selective control of a plurality of display elements of the panel module, functions for outputting shift clock signals for defining an input action of series-connected master and slave latches forming a shift register and a latch action thereof, shift data to be supplied to the shift register, and a shift-suppressing pulse signal for stopping an action for shifting the shift data, and
 wherein the timing control circuitry causes the shift-suppressing pulse signal to make a pulse change in synchronization with the non-display drive term.

8. The control device according to claim 1, wherein the panel module comprises:
 a plurality of display elements arranged like a matrix; and
 a plurality of touch sensing electrodes arranged like a matrix having a density less than that of the plurality of display elements.

9. A display and touch sense panel unit comprising:
 an integrated display and touch panel module comprising:
  a plurality of display elements having select terminals connected to gate lines corresponding to scan lines;
  a plurality of touch sensing electrodes; and
  a scan circuit operable to sequentially select the gate lines, wherein the scan circuit comprises:
   a shift register operable to shift, to a later stage of a plurality of shift stages, shift data in synchronization with changes in one or more shift clock signals; and
   a gate driver operable to receive an output of each shift stage of the plurality of shift stages, and to output a select signal of the gate line; and
 a control device comprising:
  display control circuitry comprising power supply circuitry with power source output terminals, the power supply circuitry configured to supply, using voltage setting data rewriteably written to a register of the power supply circuitry, the panel module with a selected one of a first operation source voltage and a second operation source voltage using the power source output terminals, the second operation source voltage having a smaller amplitude than the first operation source voltage, wherein the display control circuitry is configured to, during a display drive term of a display frame period:
   operate the scan circuit to perform selective control of the gate lines; and
   drive selected display elements of the plurality of display elements;
  touch control circuitry configured to operate, during a non-display drive term of the display frame period, the plurality of touch sensing electrodes, wherein the touch control circuitry comprises a select circuit configured to couple, during a portion of the non-display drive term, the touch sensing electrodes with power source stabilization capacitances coupled to the power source output terminals; and
  timing control circuitry configured to:
   communicate timing control signals to the display control circuitry and to the touch control circuitry;
   write first voltage setting data to the register specifying the first operation source voltage to be supplied during the display drive term; and
   write second voltage setting data to the register specifying the second operation source voltage to be supplied during the non-display drive term.

10. The display and touch sense panel unit according to claim 9,
 wherein the display frame period comprises a plurality of display drive terms and one or more non-display drive terms arranged in an alternating pattern, and
 wherein the display control is further configured to cause the shift clock signal to change in clock in the display drive term, and to stop the clock change of the shift clock signal in the non-display drive term.

11. The display and touch sense panel unit according to claim 10, wherein the power supply circuitry is operable to produce the first operation source voltage and the second operation source voltage,
 wherein the power supply circuitry comprises a switch circuit operable to selectively output one of the first operation source voltage and the second operation source voltage, and
 wherein the timing control circuitry causes the switch circuit to select the first operation source voltage in the display drive term, and causes the switch circuit to select the second operation source voltage in the non-display drive term.

12. The display and touch sense panel unit according to claim 9,
 wherein the plurality of display elements are arranged like a matrix, and
 wherein the plurality of touch sensing electrodes are arranged like a matrix having a density less than that of the plurality of display elements.

13. A control device for an integrated display and touch panel module, the control device comprising:
 display control circuitry comprising power supply circuitry with power source output terminals, wherein the display control circuitry is configured to:
  during a display drive term of a display frame period:
   supply, using the power source output terminals, a first operation source voltage to the panel module; and
   drive selected display elements of the panel module; and
  during a non-display drive term of the display frame period:
   output a high impedance to the power source output terminals,
  wherein the power supply circuitry comprises a power source switch circuit operable to selectively output one of the first operation source voltage and the high impedance to the power source output terminals; and
 touch control circuitry comprising voltage generation circuitry with voltage output terminals, wherein the touch control circuitry is configured to:
  during the display drive term:

output, using the voltage output terminals, a reference potential to power source stabilization capacitances coupled to the power source output terminals; and during the non-display drive term:

output, using the voltage output terminals, regulation voltages to the power source stabilization capacitances, wherein a second operation source voltage having a smaller amplitude than the first operation source voltage is supplied to the panel module; and operate a plurality of touch sensing electrodes of the panel module.

14. The control device according to claim 13, wherein the power supply circuitry is operable to produce the first operation source voltage, wherein the voltage generation circuitry is operable to produce the regulation voltages, wherein the voltage generation circuitry comprises a voltage switch circuit operable to selectively output one of the regulation voltages and the reference potential from the voltage output terminals, wherein the control device further comprises timing control circuitry configured to:

during the display drive term, cause the power source switch circuit to output the first operation source voltage, and cause the voltage switch circuit to output the reference potential, and during the non-display drive term, cause the power source switch circuit to output the high impedance, and cause the voltage switch circuit to output the regulation voltages.

15. The control device according to claim 14, wherein the second operation source voltage comprises a voltage required for suppressing a change in gradation information held by unselected display elements of the panel module.

16. The control device according to claim 14, wherein the display control circuitry has, for selective control of a plurality of display elements of the panel module, functions for outputting shift clock signals for defining an input action of series-connected master and slave latches forming a shift register and a latch action thereof, shift data to be supplied to the shift register, and a shift-suppressing pulse signal for stopping an action for shifting the shift data, and wherein the timing control circuitry is further configured to cause the shift-suppressing pulse signal to make a pulse change in synchronization with the non-display drive term.

17. The control device according to claim 13, further comprising:

a host interface circuit formed on a semiconductor substrate, wherein the host interface circuit interfaces a host device with the display control circuitry and with the touch control circuitry.

18. The control device according to claim 13, wherein the panel module comprises:

a plurality of display elements arranged like a matrix; and a plurality of touch sensing electrodes arranged like a matrix having a density less than that of the plurality of display elements.

* * * * *